April 12, 1966   R. M. QUINN   3,245,532
METHOD AND APPARATUS FOR DETECTING SURFACE UNEVENNESS Filed Aug. 1, 1962   3 Sheets-Sheet 1

INVENTOR
RICHARD M. QUINN

ATTORNEY
Duane C. Burton

April 12, 1966 R. M. QUINN 3,245,532
METHOD AND APPARATUS FOR DETECTING SURFACE UNEVENNESS
Filed Aug. 1, 1962 3 Sheets-Sheet 2

INVENTOR
RICHARD M. QUINN
ATTORNEY

INVENTOR
RICHARD M. QUINN

ATTORNEY

United States Patent Office 3,245,532
Patented Apr. 12, 1966

3,245,532
METHOD AND APPARATUS FOR DETECTING SURFACE UNEVENNESS
Richard M. Quinn, Muncie, Ind., assignor to Ball Brothers Company Incorporated, Muncie, Ind., a corporation of Indiana
Filed Aug. 1, 1962, Ser. No. 214,056
6 Claims. (Cl. 209—111.7)

This invention relates to a method and apparatus for inspecting the smoothness or continuity of a surface within a plane and more particularly to a method and apparatus which can be used to inspect the smoothness or planarity of a surface of comparatively narrow width; for example, the sealing surface of a hollow article or container such as a jar or bottle.

Food packers, as well as other users of hollow articles having a removable closure, have for many years been aware of the expense and trouble associated with using articles containing an uneven sealing surface. An article containing either a down finish defect, i.e., an unfilled finish, or a saddle, i.e., an overfilled finish, in the sealing surface is an article having a sealing surface which does not completely lie in the same plane. Consequently, an article containing either of these defects in the finish cannot be used to preserve foods because it cannot be vacuum sealed. Additionally, an article containing these defects cannot be used to store products which are in fluid or powder form due to the possibility of leakage nor can it be used to store products which must be protected from contamination.

Detection of these down finish and saddle defects in the rim or finish portions of hollow articles such as glass containers could not, prior to this invention, be accomplished by an automatic device. The circumferential speed of the glass container was so great that mechanical transducers were not effective. Height tolerance specifications for the article varied more than the tolerance permitted for these uneven defects in the finish, thereby precluding the possibility of making measurements by using the bottom of the article as a reference. For example, in glass containers a height tolerance of ±0.0312 inch is normal but for a down finish or saddle extending about 180° around the periphery of and below or above, respectively, the plane in which the rest of the sealing surface lies, the allowable deviation is limited to 0.015 inch and where the arc segment is 22° or less the allowable deviation is limited to 0.002 inch.

The inspection of glass containers for most defects occurring in glass, including the detection of irregularities in the sealing surface such as down finish and saddle defects, has been previously accomplished manually. Normally, one packer-inspector handles approximately 30 glass containers per minute. Since the defects in glass containers may be classified into a number of varieties running to 30 or more, depending on the meticulousness of the classifier, a packer-inspector has just two seconds per container to inspect and pack it. To recognize, decide and reject a container for any one of the thirty or more varieties of defects, under such conditions, is obviously a major feat of human observation. It has been discovered, however, that the inspection of glass containers for down finishes and saddles may be done automatically by positioning the sealing surface of the container between a lamp and a photoelectric cell and preferably at the focal point of the lamp's beam such that the finish or sealing surface of said container intersects said beam of light. When the container is rotated so that its finish remains in the same plane and yet passes through the focal point of the beam of light, the photoelectric cell does not register a change in the amount of illumination falling thereon. However, when a down finish or saddle appears, there is a change in the amount of illumination falling on the photoelectric cell. This change in illumination is used to generate a signal indicating the existence of a down finish or saddle defect and may also be used to activate means to reject the container.

Accordingly, the primary object of this invention is to provide a method and apparatus for detecting the planarity of a surface of comparatively narrow width.

Another object of this invention is to provide a method and apparatus for detecting the unevenness of a surface in the rim of a hollow container such as a glass jar or the like and for separating out from the other inspected articles all those containing such defects.

Another object of this invention is to provide a method and apparatus for detecting a change of illumination on a photoelectric cell unit resulting when the finish portion of a hollow article which is rotated in place causes a change in the amount of illumination falling on a photoelectric cell unit because of the existence of a down finish defect or poor seams in the finish portion of said article, or the finish portion of the article is considerably out-of-round, or the article wobbles during rotation, each condition which results in changing the amount of illumination that falls upon the photoelectric cell unit and differentiating between the change in illumination resulting from a down finish from changes in illumination resulting from any of the other conditions.

The foregoing and other objects and advantages will become more apparent from the specifications and accompanying drawings in which.

Figure 1:
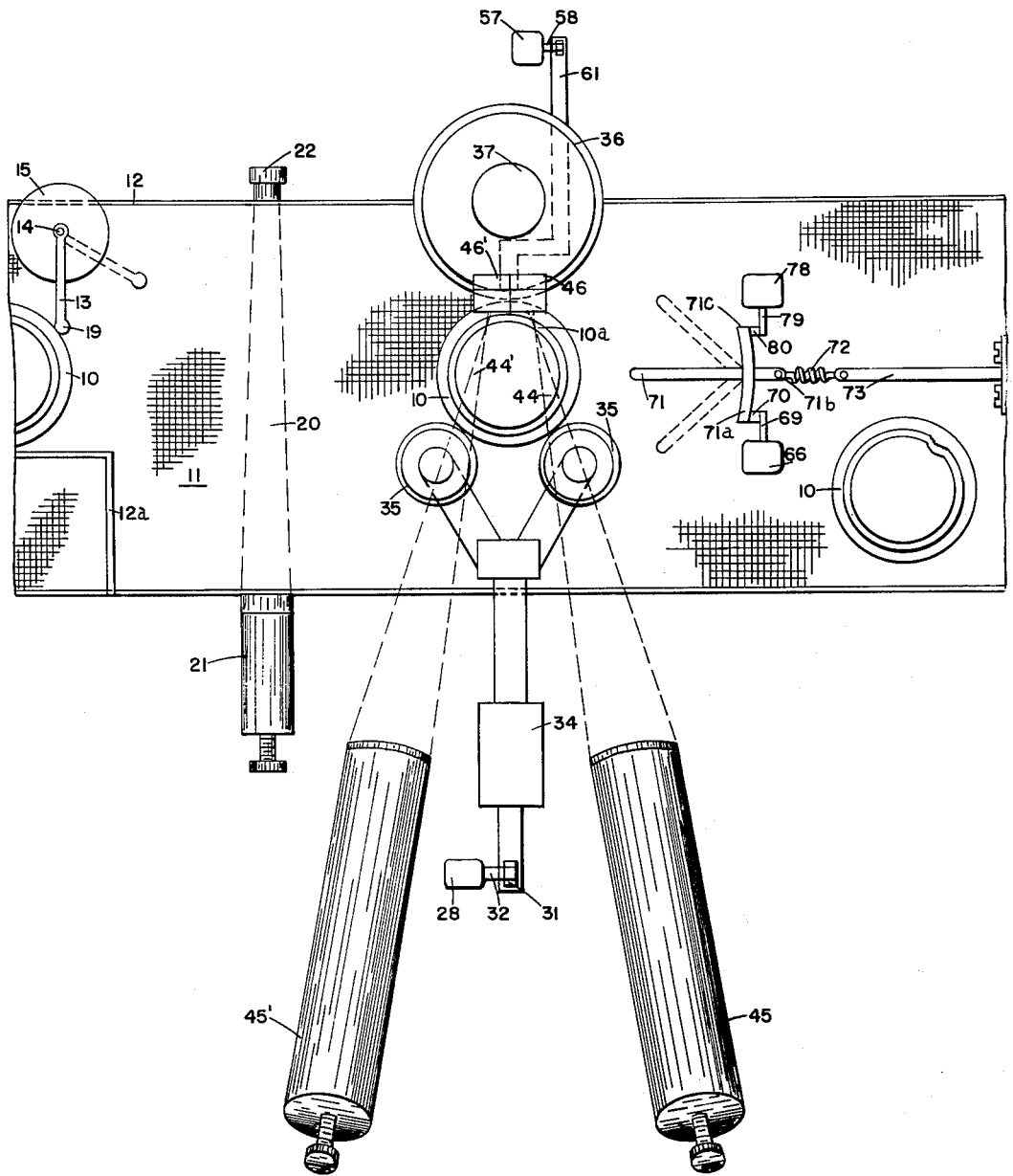
FIGURE 1 is a plan view of an inspection apparatus for detecting the existence of an uneven surface in the rim of hollow articles such as glass containers.
Figure 3:
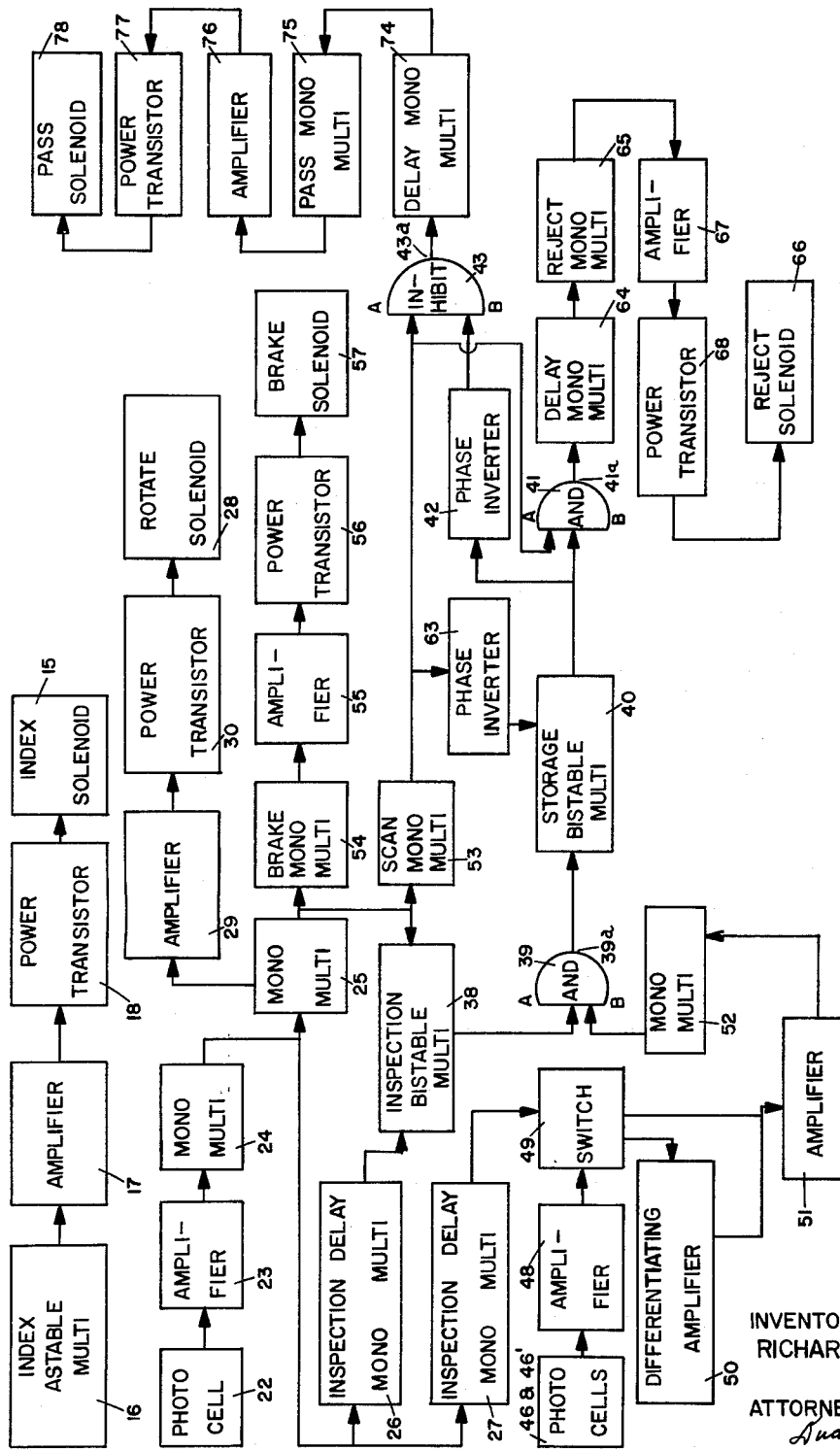
FIGURE 3 is a block diagram of the electronic system of one preferred embodiment of an automatic inspection device constructed in accordance with this invention.

Referring to the drawings, in FIGURE 1 glass containers 10 are shown positioned on an endless conveyor belt 11 having a substantially smooth surface. Guard rails 12 prevent the containers from falling off the belt 11. The conveyor belt 11 is preferably operated at a fairly constant speed without interruption and when operated without interruption the forward motion of the container 10 is arrested by an indexing arm 13 located over the belt 11. Indexing arm 13 is mounted for oscillatory motion on the shaft 14 of a D.C. rotary solenoid 15. Indexing arm 13 is shown in its container arresting position in FIGURE 1 in solid lines and in its actuated position in broken lines. The solenoid's operation is controlled by a timing device such as an astable multivibrator 16 (FIGURE 3) which is connected to a suitable power source (not shown). The pulse from the astable multivibrator 16 is used to apply voltage through a driver stage comprising an amplifier 17 and a power transistor 18 to the rotary solenoid 15. Passing the pulse through the driver stage is required to develop sufficient current so that solenoid 15 will be fully energized. The portion of the indexing arm that comes into contact with the containers is preferably covered with a nonabrasive resilient material 19, such as any one of several rubber compounds, to minimize any damage to the containers. An adjustable section 12a of the guard rail is used to restrict the flow of containers past indexing arm 13 to one at a time. The rate at which containers are processed through the inspection apparatus is controlled by the astable multivibrator 16 acting through the indexing arm 13. This rate should not exceed the maximum rate at which the apparatus can handle the containers and preferably is slightly less than the latter.

After the container 10 has passed by the indexing arm 13 it moves along belt 11 and interrupts a beam of light 20 directed laterally across the conveyor belt 11 from a lamp 21 to a suitable light sensing means 22 such as a photocell. After the container has passed through the beam of light 20 and the light again falls upon the photocell 22, a signal is obtained from the photocell. This signal passes through an amplifier 23 (FIGURE 3) and activates a monostable multivibrator 24. Monostable multivibrator 24 delays further transmission of the signal until the container reaches the correct position for rotation. The amount of delay may be easily adjusted to meet varying operational requirements and is set to permit the container to reach the inspection station. At the end of the delay period multivibrator 24 reverts to its normal state and the trailing edge of this pulse is used to drive at least two, and preferably three, other monostable multivibrators 25, 26, and 27. Multivibrator 25 is used to actuate a D.C. rotary solenoid 28 and to control the length of time the container is rotated. The signal from multivibrator 25 passes through a driver stage comprising an amplifier 29 and a power transistor 30 to solenoid 28. As in the case of the indexing unit, passing the signal through the driver stage is required to develop sufficient current to energize fully solenoid 28. A member 31 securely mounted on shaft 32 of solenoid 28 is connected with a suitable fastener 33 to a member 34 mounted for translatory movement. Member 34 has mounted on one end thereof two sets of vertically spaced-apart idler wheels 35 disposed above and longitudinally along belt 11. Actuation of solenoid 28 results in the two sets of idler wheels 35 engaging container 10 and moving said container in a direction transverse to the path of movement of belt 11 into contact with two vertically spaced-apart rotating wheels 36 mounted on shaft 37. Although a single driving or rotating wheel will suffice, two spaced-apart driving wheels are preferably used since increased container stability is thereby obtained. The spaced-apart wheels 36 are preferably driven at a fairly constant speed without interruption by any suitable means, such as a motor (not shown), the speed of rotation being dependent in part upon the size of the container being inspected. Rotation speeds of 800 to 1000 revolutions per minute have been used; however, other speeds may be used if desired. Since the conveyor belt 11 normally continues to move even when the container 10 is being rotated, it is desirable that the surface of the conveyor belt which is in contact with the base on the container be fairly smooth in order to minimize any tendency of the container to move in a vertical direction during the inspection process since such vertical movement could cause the generation of a signal resulting in rejection of a container that does not have any defects. Upon reverting to its original condition, the trailing edge of the pulse from multivibrator 25 is used to actuate three separate operations. The time and manner in which these operations are performed will be described later. Multivibrator 26 delays transmission of the signal from multivibrator 24 until the container has been brought up to and stabilized at the speed of rotation. Multivibrator 26 also prevents the pulses generated by a detection circuit, i.e., a set of lamps and photocells, the operation of which will be described later, when the container enters and leaves the inspection station from being recorded as defects and/or actuating the reject circuit. At the end of the delay period, said period being easily adjusted as to length, multivibrator 26 reverts to its normal state and the trailing edge of the pulse is used to switch a bistable multivibrator 38 to its opposite state. When bistable multivibrator 38 is in the conduction state, a signal is applied to the A input of the inspection AND gate 39. If a defect signal arriving from the detection circuit is applied to the B input of the inspection AND gate 39 during the time there is also a signal being applied to the A input from inspection bistable multivibrator 38, a signal will be generated at the output terminal 39a of the AND gate 39. When the inspection bistable multivibrator 38 is not in the conduction state, there is no signal applied at the A input of the inspection AND gate 39 and, consequently, the signals coming from the detection circuit cannot cause an output signal to be generated from the AND gate 39. When a signal is obtained from the output terminal 39a of inspection AND gate 39, it passes through a bistable multivibrator 40 which functions as a storage device to the B input of the reject AND gate 41 and through a phase inverter 42 to the B input of a pass INHIBIT gate 43. The passing of this signal through the storage bistable multivibrator 40 causes the multivibrator to be switched from is original position. The time and manner in which the storage bistable multivibrator 40 is switched back to its original position will be described later.

Figure 4:
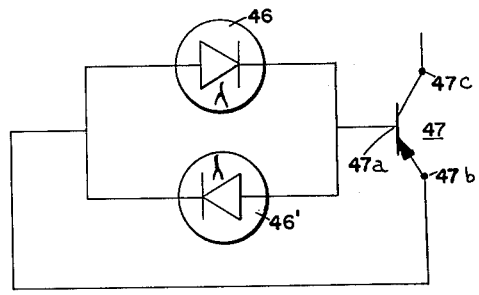
FIGURE 4 is a schematic wiring diagram of a portion of the detection circuit.
Figure 2:
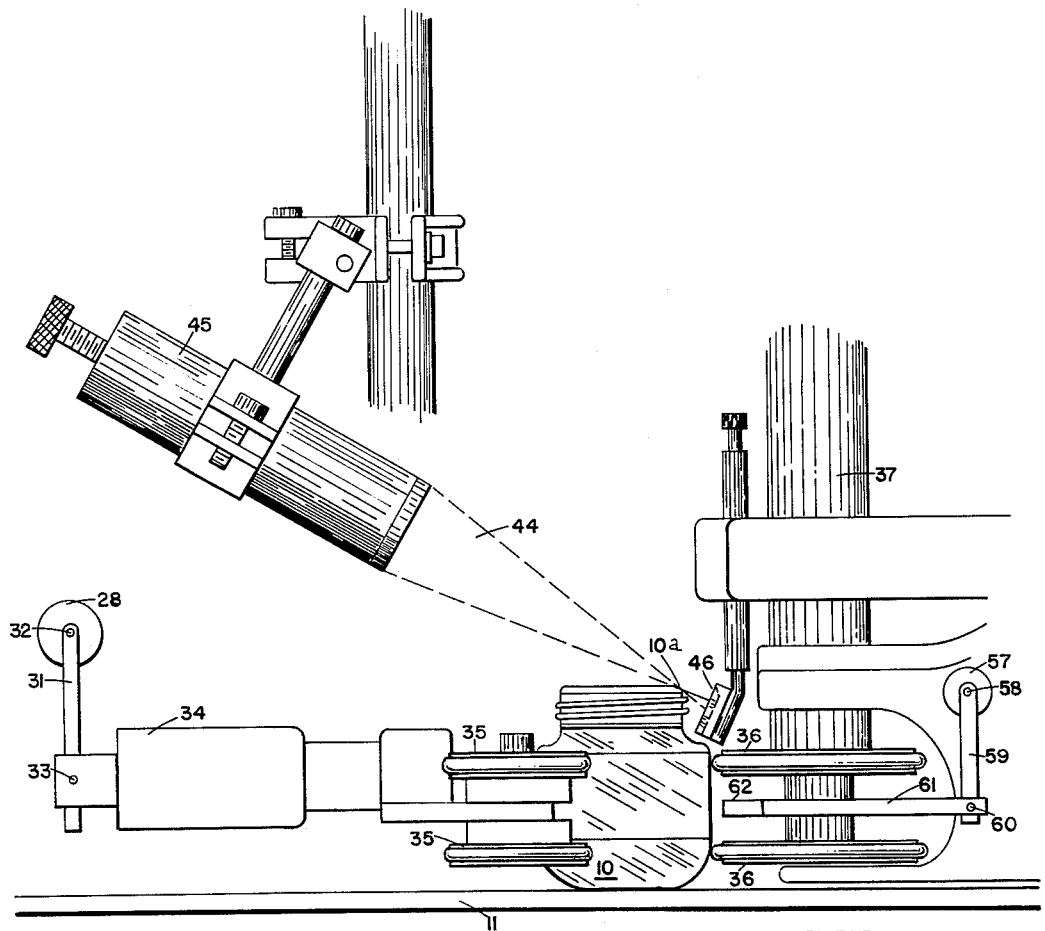
FIGURE 2 is a side elevational view of the inspection station of an automatic inspection apparatus for detecting unevenness in the sealing surface of hollow articles such as glass containers.

In the detection circuit a pair of preferably focused light beams 44 and 44' (FIGURE 2), said beams being either in the visible or invisible range such as in the ultraviolet or infrared portion of the spectrum, from lamps 45 and 45', respectively, are directed with their focal points being positioned in the general proximity of the sealing surface 10a of container 10 but on separate spaced-apart portions of said sealing surface and preferably falling upon said sealing surface. Although the included angle between the intersection of a plane passing through the sealing surface 10a of container 10 and a plane in which the beams of light 44 and 44' lie may be any value other than 90°, it has been found that a high degree of inspection efficiency is obtained when this angle is maintained between 35° and 70° and preferably between 50° and 60° since variations in container height do not affect the inspection accuracy of the apparatus when the included angle is kept within this range. Light sensing means 46 and 46' such as photocells are positioned in line with beams of light 44 and 44', respectively, and transverse thereto so that under certain circumstances all, or substantially all, of the light from lamps 45 and 45', respectively, will fall thereupon. Photocells 46 and 46', are constructed to generate a signal whenever there is a change in the amount of illumination falling thereon. A change in the amount of illumination falling thereon occurs when a down finish or a saddle passes in the general vicinity of the focal point of the beams of light, an increased amount of illumination occurring as a result of the existence of a down finish and a decreased amount as a result of the existence of a saddle. Such a change also occurs if the container wobbles during rotation or has poor seams or is bad from an out-of-round viewpoint. The photocells 46 and 46' are preferably connected as shown in FIGURE 4 in which the cells are connected back-to-back between the base 47a and the emitter 47b of a transistor 47 such as a germanium transistor, said transistor being the input stage of amplifier 48. The photocell circuit is adjusted such that no signal is available at the collector 47c of the transistor 47 when both cells 46 and 46' receive an equal amount of illumination. However, when one cell receives a different amount of illumination than the other, a signal is obtained from the collector 47c of the transistor 47. This detection circuit is independent of any changes occurring in the background lighting conditions since in nearly every case any change in the background lighting conditions uniformly affects both cells. It will be understood that a single lamp and photocell may be used instead of the arrangement just described; however, the use of only one lamp and one photocell will not be independent of changes in the background lighting conditions unless the photocell is appropriately shielded. The signal obtained at collector 47c passes on through amplifier 48, switch 49, a differentiating amplifier 50, and amplifier 51. The purpose of differentiating amplifier 50 is to discriminate between the signals having varying periods in their wave form. Since the voltage wave form produced by container wobble is usually of a much longer period than that produced by the existence of a down finish defect, it is possible, with the use of differentiating amplifier 50, to discriminate between the two types of signals and thereby prevent the rejection of an unblemished or useable container. Containers having poor seams or being poor from an out-of-round viewpoint will cause a signal to be produced which, except for the signal strength, is similar to that produced by a down finish defect. To discriminate between these two signals, the signal is passed through amplifier 51 to obtain a maximum voltage difference between these two signals. Amplifier 51 preferably comprises three amplifiers (not separately shown). The gain of the last two of these three amplifiers is preferably adjustable as is the trigger level of a multivibrator 52. The signal produced as a result of the existence of poor seams or poor out-of-roundness is generally weaker than the signal produced as a result of the existence of a down finish. Appropriate adjustment of the trigger level of monostable multivibrator 52 prevents this weaker signal from activating multivibrator 52 and thus prevents rejection of the container. However, the signal produced by containers having very bad seams or an extremely poor out-of-round condition is so similar to the signal produced by a down finish defect that it will cause the container to be rejected. However, this does not pose a problem because such containers are neither attractive in appearance nor do they easily lend themselves for filling and sealing by machine. The pulse from multivibrator 52 is of very short duration. Multivibrator 52 is used to insure that the pulse transmitted to the B input of the inspection AND gate 39 is always the same, regardless of the size and shape of the defect.

Since the frequency of saddles occurring in containers is far less than the frequency of down finish defects occurring in containers, an automatic apparatus constructed only to detect down finish defects would in many instances be adequate. Although saddles can be detected by the same general principle as is used to detect down finish defects, since the signal obtained at the collector 47a of the transistor 47 shown in FIGURE 4 and also at the output of amplifier 48 has a polarity opposite that of the signal obtained for a down finish defect, it need not nor should it pass through the differentiating amplifier 50 because of the phase inversion which takes place within differentiating amplifier 50. Consequently, detection of saddles is accomplished after multivibrator 27 which delays the transmission of the signal from multivibrator 24 until the container has been brought up to and stabilized at its speed of operation and inspected for the existence of down finish defects, reverts to its normal condition. In its normal condition, switch 49 is positioned to pass the signal from amplifier 48 to amplifier 51 thereby bypassing differentiating amplifier 50. By deleting differentiating amplifier 50, no distinguishment can be made between a signal produced as a result of a saddle from a signal produced as a result of container wobble. However, since wobbling dampens out fairly rapidly and since saddle detection occurs during the latter part of the spin cycle, this does not present a problem of any serious consequence. With this arrangement the detection of containers having saddle defects may be accomplished with a high degree of efficiency. Consequently, if multivibrator 52 has not already been actuated as a result of the existence of a down finish defect, it will be actuated if the container contains a saddle defect. In other words, the existence of either of these defects in a container being inspected suffices to cause a signal to be transmitted to the B input of the inspection AND gate 39. It is readily apparent that the use of mulivibrator 27 and switch 49 is not required in an apparatus used solely for the detection of down finish defects. If inspection is made only for down finish defects, the rate at which containers are processed through the apparatus may be increased since the total spin cycle may be appreciably shortened. Parenthetically, although the container must travel through at least one revolution after it has been brought up to and stabilized at the speed of rotation to insure proper inspection for one type of defect inspection, in actual practice the container is usually rotated about 1¼ to 1½ revolutions to insure that the entire surface has been scanned during the inspection period. When a signal arrives at the B input of inspection AND gate 39 during the period in which the A input of AND gate 39 also has a signal on it, a signal will be obtained in the output terminal 39a of AND gate 39. As previously described, the signal from the output terminal 39a of inspection AND gate 39 activates storage bistable multivibrator 40 which results in a signal being transmitted simultaneously to the B input terminal of the reject AND gate 41 and through a phase inverter 42 to the B input terminal of the pass INHIBIT gate 43. After a predetermined period of time, said period being adjustable to meet various operating requirements, monostable multivibrator 25 reverts to its normal condition. A trailing edge of this pulse is used to activate a brake which stops the rotation of the container at the end of its spin cycle and a scanning device 53 and to reset the inspection bistable multivibrator 38 back to its original position. The braking operation is initiated when the signal from multivibrator 25 actuates monostable multivibrator 54 in the brake circuit. The pulse generated by the multivibrator 54 is used to apply voltage through a driver stage comprising an amplifier 55 and a power transistor 56 to a D.C. rotary solenoid 57. Attached to the shaft 58 of rotary solenoid 57 is a member 59 which is connected by a fastener 60 to a braking member 61 mounted for translatory movement. Braking member 61 is preferably positioned between the spaced-apart rotating wheels 36 and has a brake-lining material 62 attached on the end thereof positioned adjacent to the container which comes into sliding contact with the surface of the rotating container and causes the container to stop rotating. When braking member 61 is brought into contact with the container 10, the container is moved out of contact with the rotating wheels 36. After the container has ceased to rotate, the idler wheels 35 and the braking member 61 retract to their original position, leaving the container free to move along on a conveyor belt 11.

The signal from multivibrator 25, in addition to activating multivibrator 54 which is used to actuate the brake operation, activates the scanning device 53 which may comprise a monostable multivibrator. Scanning device 53 is used to determine whether a signal has been received in the B inputs of gates 41 and 43 and to reset storage bistable multivibrator 40 to its original condition if such is required. In order for the signal from the scan multivibrator 53 to reset storage bistable multivibrator 40 to its original condition, it is necessary that it first pass through the phase inverter 63. If a signal has been received at the B inputs of gates 41 and 43, then a signal will also be obtained at the output terminal 41a of the reject AND gate 41 when a signal is received at the A input of the reject AND gate 41 from scan multivibrator 53, but a signal will not be obtained at the output terminal 43a of the pass INHIBIT gate 43. An output signal from the reject AND gate 41 activates a monostable multivibrator 64 in the reject circuit. Multivibrator 64 delays further transmission of the signal until the container has reached a position on the belt where it may be removed from the containers having no objectionable sealing surface defects. The trailing edge of the pulse from multivibrator 64 actuates monostable multivibrator 65 which controls the activation time of a D.C. rotary solenoid 66. The pulse from monostable multivibrator 65 is used to apply voltage through a driver stage comprising an amplifier 67 and a power transistor 68 to solenoid 66.

Securely attached to shaft 69 of solenoid 66 is an arm 70. Actuation of solenoid 66 causes arm 70 to contact a horizontally disposed portion 71a of a pivotally mounted member 71, thereby causing member 71 to pivot in a clockwise direction (FIGURE 1). Member 71 is shown in its neutral position in FIGURE 1 in solid lines and in its actuated or container flow position in broken lines. Member 71 is biased in its neutral position by a spring 72 that is connected to a rigid support 73 and a horizontally disposed portion 71b of member 71. After the container has passed by member 71, arm 70 moves out of contact with horizontally disposed portion 71a of member 71 and returns to its original position. As arm 70 returns to its original position, spring 72 causes member 71 to return to its original or neutral position.

If a signal has not been received by the B inputs of gates 41 and 43, no signal will be obtained at the output terminal 41a of gate 41 when a signal is also received at the A input from scan multivibrator 53. Instead, a signal will be obtained at the output terminal 43a of the pass INHIBIT gate 43. A signal from pass INHIBIT gate 43 activates a monostable multivibrator 74 in the pass circuit. Multivibrator 74 delays further transmission of the signal in the same manner as did multivibrator 64 in the reject circuit. The trailing edge of the pulse from multivibrator 74 actuates monostable multivibrator 75. The pulse from multivibrator 75 is used to apply voltage through a driver stage comprising an amplifier 76 and a power transistor 77 to a D.C. rotary solenoid 78. Securely attached to shaft 79 of solenoid 78 is arm 80. Actuation of solenoid 78 causes arm 80 to contact a horizontally disposed portion 71c of pivotably mounted member 71 causing said member to pivot in a counter-clockwise direction thereby permitting the container to move to an area where containers having no objectionable defects are collected. After the container has passed by member 71 and arm 80 has returned to its original position, spring 72 causes member 71 to return to its original position.

The astable multivibrator 16 used in the index circuit is a free running multivibrator which functions as an oscillator or clock, thereby setting the pace for the apparatus. Although various kinds of oscillators could be used in the instant apparatus, the oscillator multivibrator 16 was selected because the square wave pulses which are obtained from this unit can be adjusted to any desired duration and frequency. The monostable multivibrators which are used as timing circuits have one stable state and one quasi-stable state; i.e., when actuated they will switch to the opposite conduction state for a predetermined length of time depending upon the circuit time constant, and then automatically switched back to the stable state. The bistable multivibrator has two stable states; i.e., it will stay indefinitely in either of its two states. A bistable multivibrator is used to operate the inspection AND gate 39 rather than a monostable multivibrator since it is desired that the circuit close as nearly as possible at the same time as the container is released from the inspection station. A small amount of inconsistency between the rotate monostable multivibrator 25 and the inspection delaying monostable multivibrator 26 can be tolerated; however, if the inspection AND gate 39 were left open until the rotate solenoid 28 permits the idler wheels 35 to release the container, the detection circuit would transmit a signal to the reject circuit. The storage bistable multivibrator 40 is used to store the defect signal until after the container has been released. This is accomplished through storage bistable multivibrator 40 continuously supplying a signal to the B inputs of gates 41 and 43 until it is reset or switched back to its original position. Consequently, a signal produced by the detection circuit during any part of the inspection period will be held or "stored" until the rotate monostable multivibrator 25 switches back to its original position and pulses the scan monostable multivibrator 53. The scan monostable multivibrator 53 clears the storage circuit when it resets or switches the storage bistable multivibrator 40 back to its original position and readies the circuit for the next container. An increased processing rate is obtained with this particular arrangement since storage of the pass-reject information for later use permits the container in the inspection station to be released and another one moved into position before the first container has been removed from the processing line.

Although the apparatus described uses few vacuum tubes, relays or mechanical switches, it will be understood that such items can be used more extensively than has been described. An experimental apparatus constructed in accordance with the present invention but used only for detection of down finish defects has successfully processed more than 90 glass containers per minute and can be operated to process at least 105 containers per minute.

From the foregoing description of the illustrative apparatus shown in the drawings, it will be apparent that the invention provides an efficient and reliable method and means for handling a continuous series or line of articles, such as glass containers for detecting down finish or saddle defects in the rim of any one of such containers, and for thereafter separating from the good containers those in which objectionable defects were detected. The component operations of the apparatus are coordinated and synchronized for effective handling of the articles, detection of uneven sealing surfaces in the rim thereof, sorting out the defective articles and delivery of the remaining inspected articles to a suitable delivery or the article conveying means.

It is to be understood that this invention is not limited to the exact embodiment of the device shown, which is merely by way of illustration and not limitation, as various other forms and modifications will be apparent to those skilled in the art; e.g., the detection circuit may be modified to permit simultaneous inspection for down finishes and saddles and thereby decrease the spin cycle at the inspection station by the time required to inspect for saddles which requires at least one revolution of the container, and it is therefore intended that the appended claims cover all such changes and modifications.

What I claim is:

1. An inspection apparatus for detecting an unevenness in a surface of an article comprising means for directing focal points of a plurality of focused light beams on separate portions of a surface of an article, means for producing relative motion between said surface and said light beams, a plurality of light sensing means, one of said light sensing means transversely disposed to the light path of each light beam and positioned beyond the focal point of the light beam, each light sensing means being capable of generating a signal when an unevenness in said surface passes through said light beam, means for comparing said signals from said light sensing means and generating a control signal only when the signals from the light sensing means differ from one another, differentiating means for discriminating between a control signal generated by the existence of an unevenness in said surface and a control signal generated by instability of said surface, and means responsive only to the control signal generated by the existence of an unevenness for rejecting said article.

2. An inspection apparatus for detecting an unevenness in a sealing surface of a hollow article comprising means for presenting a hollow article at an inspection station, means for directing focal points of a plurality of focused light beams on separate portions of a sealing surface of an article, means for producing relative motion between said surface and said light beams, a plurality of photocells, one of said photocells transversely disposed to the light path of each light beam and positioned beyond the focal point of the light beam, each photocell being capable of generating a signal when an unevenness in said surface passes through said light beam, means for comparing the signals from said photocells and generating a control signal only when the signals from the photocells differ from one another, differentiating means for discriminating between a control signal generated by the existence of an unevenness in said surface and a control signal generated by instability of said surface, and means responsive only to the control signal generated by the existence of an unevenness for rejecting said article.

3. An inspection apparatus for detecting an unevenness in a sealing surface of a cylindrical, hollow article comprising means for presenting a cylindrical hollow article at an inspection station, means for directing focal points of a plurality of focused light beams on separate portions of a sealing surface of said article, means for rotating said article about its axis while it is being inspected at said station, a plurality of light sensing means, one of said light sensing means transversely disposed to the light path of each light beam and positioned beyond the focal point of the light beam, each light sensing means being capable of generating a signal when then there is a change in the amount of illumination falling thereon such as when an unevenness in said surface passes through said light beam, means for comparing the signals from said light sensing means and generating a control signal only when the signals from the light sensing means differ from one another, differentiating means for discriminating between a control signal generated by the existence of an unevenness in said surface and a control signal generated by instability of said surface, and means responsive only to the control signal generated by the existence of an unevenness for rejecting said article.

4. An inspection apparatus for detecting an unevenness in a sealing surface of a hollow glass article comprising means for presenting a hollow glass article at an inspection station in an upright position, means for directing focal points of a plurality of focused light beams on separate portions of a sealing surface of an article, means for rotating said article about its vertical axis while it is being inspected at said station, a pluralty of photocells, one of said photocells transversely disposed to the light path of each light beam and positioned beyond the focal point of the light beam, each photocell being capable of generating a signal when there is a change in the amount of illumination falling thereon such as when an unevenness in said surface passes through said light beam, signal monitoring means arranged to receive and compare signals from said photocells and generate a control signal only when the signals from said photocells differ from one another, differentiating means for discriminating between a control signal generated by the existence of an unevenness in said sealing surface and a control signal generated by wobbling of said article, and means responsive only to the control signal generated by the existence of an unevenness for rejecting said article.

5. A method of detecting an unevenness in a surface of an article comprising directing focal points of a plurality of focused light beams on separate portions of the surface of an article, producing relative motion between said surface and said light beams, receiving and measuring portions of said light beams after said beams have been diverted to said surface, generating signals representative of the amount of light received from each said beam, comparing said signals and generating a control signal whenever one signal differs from another, and rejecting said article in response to said control signal.

6. A method of detecting an unevenness in a surface of an article comprising directing focal points of a plurality of focused light beams on separate portions of the surface of an article, producing relative motion between said surface and said light beams, receiving and measuring portions of said light beams which pass through said surface, generating signals representative of the amount of light from each beam received which passed through said surface, comparing each signal and generating a control signal whenever one signal differs from another, monitoring said control signal to determine whether generated by the existence of an unevenness in said surface or by instability of said surface, and rejecting the article in response to a signal generated by the existence of an unevenness in said surface.

References Cited by the Examiner

UNITED STATES PATENTS

| | | | |
|---|---|---|---|
| 2,902,151 | 9/1959 | Miles | 209—111.5 |
| 3,027,798 | 4/1962 | Mathias | 209—111.5 XR |
| 3,089,594 | 5/1963 | Early | 209—111.5 |
| 3,090,870 | 5/1963 | Ruckert | 209—111.7 XR |

ROBERT B. REEVES, *Primary Examiner.*